(12) United States Patent
McConahay et al.

(10) Patent No.: US 8,955,469 B2
(45) Date of Patent: Feb. 17, 2015

(54) CYLINDRICAL HYDROGEN FUEL GENERATOR HAVING PASSIVE TUBULAR CELLS

(71) Applicant: Hydrogen Injection Technology, Inc., Tracy, CA (US)

(72) Inventors: Fred E. McConahay, Ripon, CA (US); John D. Dupree, Tracy, CA (US); Richard Ortenheim, Tracy, CA (US)

(73) Assignee: Hydrogen Injection Technology, Inc., Tracy, CA (US)

( * ) Notice: Subject to any disclaimer, the term of this patent is extended or adjusted under 35 U.S.C. 154(b) by 0 days.

(21) Appl. No.: 14/231,748

(22) Filed: Apr. 1, 2014

(65) Prior Publication Data

US 2014/0290594 A1    Oct. 2, 2014

Related U.S. Application Data

(63) Continuation of application No. 13/077,846, filed on Mar. 31, 2011, now Pat. No. 8,714,115.

(60) Provisional application No. 61/322,696, filed on Apr. 9, 2010.

(51) Int. Cl.
F02B 43/08    (2006.01)

(52) U.S. Cl.
CPC .................................... F02B 43/08 (2013.01)
USPC .............................................. 123/3; 204/267

(58) Field of Classification Search
USPC ................ 123/3, DIG. 12; 204/267, 272–273
See application file for complete search history.

(56) References Cited

U.S. PATENT DOCUMENTS

| | | | | | |
|---|---|---|---|---|---|
| 3,906,913 | A | * | 9/1975 | Rupe | 123/525 |
| 3,980,053 | A | * | 9/1976 | Horvath | 123/3 |
| 3,990,962 | A | * | 11/1976 | Gotz | 204/268 |
| 4,040,938 | A | * | 8/1977 | Robertson | 204/283 |
| 4,133,847 | A | * | 1/1979 | Feuerman | 261/18.2 |
| 4,175,026 | A | * | 11/1979 | Houseman | 204/272 |
| 4,368,705 | A | * | 1/1983 | Stevenson et al. | 123/357 |
| 4,442,801 | A | * | 4/1984 | Glynn et al. | 123/3 |
| 4,675,085 | A | * | 6/1987 | Vasquez | 205/337 |
| 5,231,954 | A | * | 8/1993 | Stowe | 123/3 |
| 5,385,657 | A | * | 1/1995 | Dungan | 204/230.5 |
| 5,399,251 | A | * | 3/1995 | Nakamats | 204/262 |
| 5,450,822 | A | * | 9/1995 | Cunningham | 123/3 |
| 5,452,688 | A | * | 9/1995 | Rose | 123/3 |
| 5,458,095 | A | * | 10/1995 | Post et al. | 123/3 |
| 5,513,600 | A | * | 5/1996 | Teves | 123/3 |
| 5,603,290 | A | * | 2/1997 | Swain et al. | 123/41.86 |
| 5,733,421 | A | * | 3/1998 | Pettigrew et al. | 204/228.2 |
| 5,753,383 | A | * | 5/1998 | Cargnelli et al. | 429/434 |
| 5,858,185 | A | * | 1/1999 | Christian | 204/272 |
| 6,121,676 | A | * | 9/2000 | Solberg | 257/686 |
| 6,209,493 | B1 | * | 4/2001 | Ross | 123/3 |
| 6,332,434 | B1 | * | 12/2001 | De Souza et al. | 123/3 |
| 6,336,430 | B2 | * | 1/2002 | de Souza et al. | 123/3 |

* cited by examiner

Primary Examiner — Hung Q Nguyen
(74) Attorney, Agent, or Firm — Lowenstein Sandler LLP

(57) ABSTRACT

A hydrogen fuel generator having a fuel cell unit having a computerized injection controller and passive conductive tubular cells that are not coupled to a power source is described.

20 Claims, 10 Drawing Sheets

CYLINDRICAL HYDROGEN FUEL GENERATOR HAVING PASSIVE TUBULAR CELLS

RELATED APPLICATIONS

This application is a continuation of U.S. patent application Ser. No. 13/077,846, filed Mar. 31, 2011, which claims the benefit of U.S. Provisional Application No. 61/322,696, filed Apr. 9, 2010, the entire contents of which are incorporated herein by reference. This application is related to co-pending U.S. application Ser. No. 13/077,836, filed Mar. 31, 2011, the contents of which are incorporated herein by reference.

TECHNICAL FIELD

Embodiments of the present invention relate to fuel systems, and more specifically, to a supplementary hydrogen fuel generator and a computerized injection controller to supplement an existing fuel system.

BACKGROUND

Using hydrogen as a supplemental fuel in motor vehicle engines has been proposed to increase the performance of the engine. When using hydrogen and oxygen as part of the air-fuel mixture for the engine, the performance of the engine increases, including increasing the mileage (e.g., miles per gallon (MPG)) and/or reducing the emissions of the engine. The hydrogen gas may be generated through electrolysis of an aqueous solution. The hydrogen gas may be referred to as monatomic hydrogen (HHO) gas, or "Brown Gas," which is created by electrolysis by separating H2O into molecules by passing an electrical current through water or an aqueous solution. Electrolysis is a method of using an electric current to drive an otherwise non-spontaneous chemical reaction. Electrolysis is commercially highly important as a stage in the separation of elements from naturally occurring sources such as ores using an electrolytic cell. The three main components required to achieve electrolysis are 1) a liquid containing mobile ions, also referred to as an electrolyte; 2) an external power source of direct electric current; and 3) two electrodes.

One conventional system, described in U.S. Pat. No. 5,231,954, filed Jan. 18, 2005, describes an electrolyzer having an electrolysis chamber and a rack with an anode and a cathode and alternating supplemental electrodes.

Another conventional hydrogen generating system is described in U.S. Pat. No. 6,336,430, filed Jun. 29, 1998. This conventional hydrogen generating system includes an electrolysis cell for generating hydrogen and oxygen gases by electrolysis of an aqueous solution, a power source for providing electrical power to the electrolysis cell, and an outlet flow means for introducing the generated gases into the intake manifold system of an internal combustion engine. The electrolysis cell has a cylindrical shaped case of polyvinyl chloride and an electrode assembly having a series of bipolar electrode plates between an anode and a cathode, held together by polypropylene bolts and nuts. The electrode plates are a series of alternating parallel anodes and cathodes joined together by means of bridging straps, and the outside cathode and anode electrode plates are connected to the positive and negative supply from the motor vehicle system via an adapter. The U.S. Pat. No. 6,336,430 also describes that the series of bi-polar electrodes could be concentric circular electrodes.

The conventional system described in U.S. Pat. No. 6,336,430 also includes a controller for monitoring the operating conditions of the hydrogen generating system and for controlling parameters of the hydrogen generating system to control its operation in response to the monitoring. U.S. Pat. No. 6,336,430 describes the controller monitoring parameters of the hydrogen generating system, including the level of aqueous solution, temperature of the solution, engine vacuum, and pressure in the gas supply line. In response to negative inputs for these parameters, the controller turns off the hydrogen generating system. The controller can also regulate the electrical power provided to the electrolysis cell, controlling the amount of hydrogen to be generated, as well as the power provided to a pump to control the flow rate of the pump, if the pump is included as part of the system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
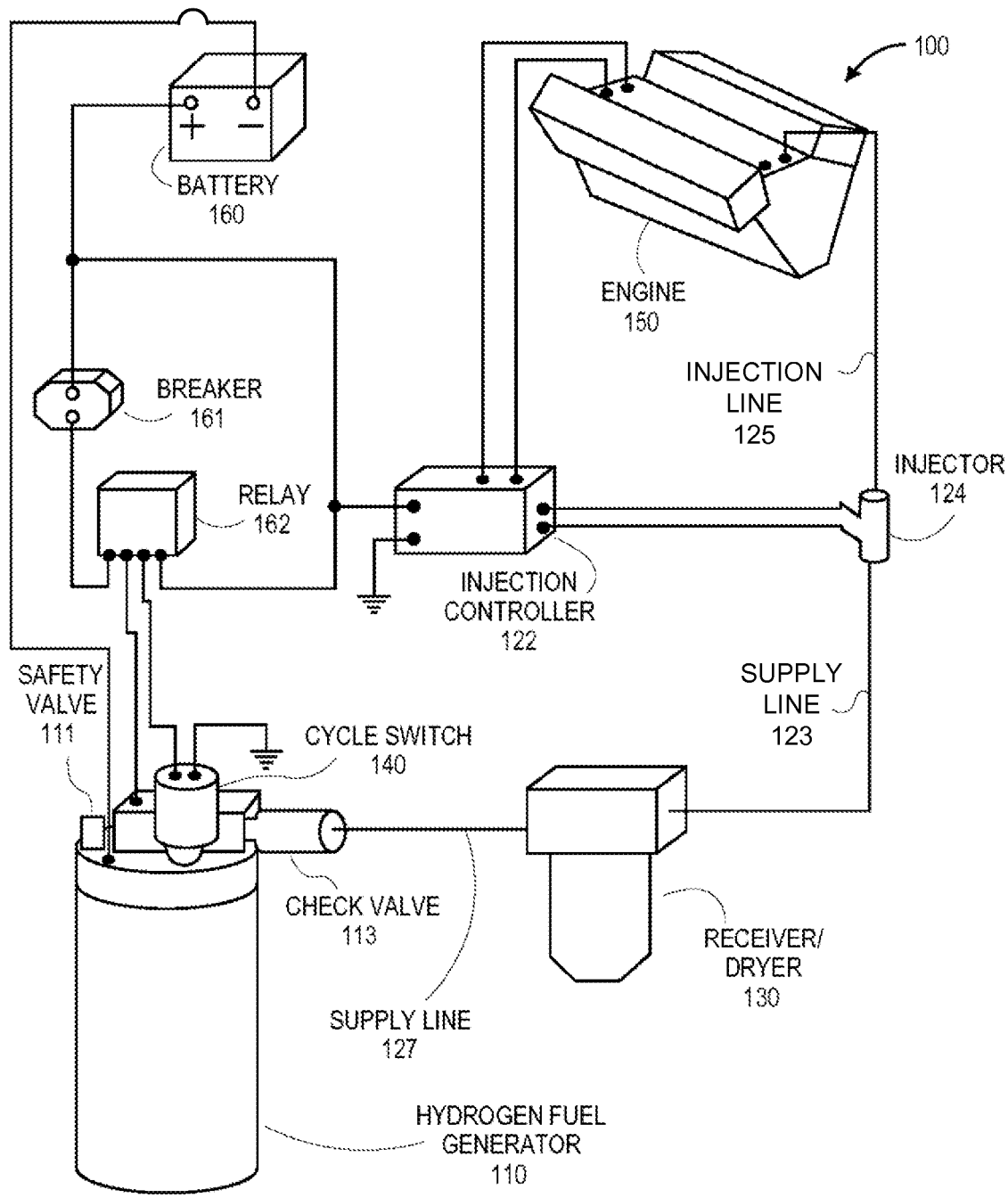
FIG. 1 is a diagram of a supplementary fuel system having a hydrogen fuel generator and a computerized injection controller according to one embodiment.

A method and system of a supplementary fuel system for delivering hydrogen to an engine is described. The embodiments described herein include hydrogen fuel generator, also referred to as an electrolyzer that is designed to be simple, compact and to produce HHO gas. HHO gas is being produced in order to "boost" the vehicle or generator by improving miles per gallon (MPG) performance, improving the burn quality of the fuel, thus reducing any unwanted emissions, and producing more power and to clean out old carbon deposits inside the engine. The supplementary fuel system adds the HHO gas to the air entering the engine. In one embodiment, the supplementary fuel system can be integrated to work with existing engines, and may leverage some of the existing components associated with the engine. In another embodiment, the supplement fuel system can be integrated along with another type of fuel system when initially manufactured or assembled. In addition, the embodiments describe an on-demand system that generates hydrogen gas on demand, instead of storing the hydrogen gas.

The embodiments described herein can be used to provide an improved fuel system for an engine. The embodiments described herein can be used to address the need for drastic emission reductions and improved fuel economy in all engines. The term "engine" as used herein refers to any engine that consumes a fuel-air mixture within the engine itself so that the host gaseous produces of the combustion act directly on the surfaces of engine's moving parts. Such moving parts may include pistons, turbine rotor blades, or the like. The engine may be an internal combustion engine, including gasoline engines, diesel engines, Liquefied petroleum gas (LPG) engines, Bio Diesel engines, gas turbine engines, jet engines, rocket engines, or the like. The embodiments described herein can be utilized with any engine, regardless of fuel type currently being utilized. The embodiments described herein can work along with an existing fuel source to compliment the efficiency of fuel burn within the combustion chamber, thus reducing emissions and increasing fuel economy. The embodiments described herein generate hydrogen gas from an aqueous electrolyte solution utilizing electrolysis to achieve this process.

By including HHO gas in your combustion chamber, the temperatures may decrease slightly, and may be a helpful additive or fuel because the hydrogen first burns inside the engine and the byproduct is steam, which becomes water as it condenses. The condensation may possibly cool the outside of the engine's exhaust. The embodiments described herein may result in approximately 20% to 70% improvement of gas mileage. Alternatively, other percentages may be achieved. However, it should also be noted that the overall mileage increase in vehicles may be determined by several factors, such as driving habits, the condition of your vehicle, tire inflation, driving conditions and more. In addition, because hydrogen gas burns at a cooler temperature than diesel, the viscosity of the engine's oil may not break down as quickly. This may lead to longer periods between oil changes and less wear to the cylinders, hence reducing your overall maintenance costs of the engine.

The embodiments described herein may also reduce engine emissions. In some cases, the embodiments have been shown to significantly reduce the noxious and toxic engine emissions, thereby reducing greenhouse gas emissions and providing cleaner air than vehicles without these embodiments. In addition, hydrogen and oxygen are two of the most abundant elements available on earth. The hydrogen-per-unit is three times more powerful in energy produced than gasoline and almost four times that of ethanol. Not only will emissions decrease to lower levels, the fuel (e.g., gasoline, diesel, or the like) may combust more efficiently with fewer pollutants in the exhaust. The oil may stay cleaner, the plugs may last longer, the engine may stay cleaner internally, and the engine temperature may drop by several degrees Fahrenheit. Alternatively, these embodiments may provide other benefits as would be appreciated by those of ordinary skill in the art having the benefit of this disclosure.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "monitoring," "processing," "providing," "computing," "calculating," "determining," "displaying," or the like, refer to the actions and processes of a computer system, or similar electronic computing systems, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer system specifically programmed by a computer program stored in the computer system. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a diagram of a supplementary fuel system 100 having a hydrogen fuel generator 110 and a computerized injection controller 122 according to one embodiment. The supplementary fuel system 100 includes a hydrogen fuel generator 110 to generate hydrogen gas using electrolysis. The hydrogen fuel generator 110 delivers hydrogen gas through the check valve 113 to the hydrogen supply line 127. The check valve 113 may be used to prevent the back flow of fluids into the hydrogen fuel generator 110. As the flow of hydrogen gas leaves the hydrogen fuel generator 110, the supply line 13 routes the hydrogen gas through a receiver/dryer 130 to ensure no moisture is passed through to the engine 150. From the receiver/dryer 130, the hydrogen gas passes through the supply line 123 to an injection control system 120 (additional details regarding the injection control system 120 are described with respect to FIGS. 5A, 5B, and 6), including a computerized injection controller 122 and an injector 124. The injection control system 120 regulates the flow of hydrogen gas to the engine 150 on the injection line 125. The injection control system 120 can regulate the amount of hydrogen gas that is induced into the engine at any given time. Unlike the conventional system described in U.S. Pat. No. 6,336,430, which uses a flow control valve and a pump to regulate the flow of gas, the injection control system 120 can electronically regulate the injector 124 to inject a specified amount of hydrogen gas into the engine 150 via the injection line 125. The injection control system 120 does not regulate how much hydrogen gas is being generated by the hydrogen fuel generator 110, rather how much hydrogen gas is delivered to the engine 150 at any given point in time. For example, the injection control system 120 controls the appropriate amount of hydrogen to be injected into an air intake of the engine. The injection controller 122 may be programmed for each individual engine at any given time. In one embodiment, the injection control system 120 is programmed for each specific engine to optimize the amount of hydrogen gas injected into the engine 150 to increase emission reduction and increase fuel economy. In some cases, the injection control system 120 is programmed to achieve the highest emission reduction and highest fuel economy obtainable for a given engine.

In one embodiment, the supply line 123 and injection line 125 are stainless steel tubing, such as stainless steel aircraft tubing. In another embodiment, supply line 123 and injection line 125 are polytetrafluoroethylene (PTFE) tubing (also commonly referred to DuPont® brand name "Teflon®" tubes). PTFE is a synthetic fluoropolymer or tetrafluoroethylene. Alternatively, other types of lines may be used as would be appreciated by those of ordinary skill in the art having the benefit of this disclosure. The supply line 127 (also referred to as a fuel line) may be stainless steel fuel line, as well as other types of supply lines.

In one embodiment, the injection control system is a stand-alone injection controller 122, which provides a map having multiple cell elements that contain a number that indicates the amount of hydrogen that is to be delivered to the engine. In one embodiment, the map is a three-dimensional mapping of the flow of hydrogen gas to be injected. In one embodiment, a three-dimensional map is used that includes multiple cell locations (also referred to as "cells"), where each cell locations contains a value that corresponds to an injector pulse width (e.g., the amount of time the injector is active (e.g., on-time) or the amount of time the injector is pulsed) based on multiple factors, such as manifold pressure and RPMS. In this embodiment, the injection controller 122 programs the injector pulse width directly into cell locations of the map according to the boost pressure and revolutions per minute. In one embodiment, the injection controller 122 includes an interface, such as a serial port to program and calibrate the injection controller 122. In one embodiment, the injection controller 122 receives various inputs through the interface. For example, the injection controller 122 can monitor the engine's tachometer signal, injector loom, and/or vacuum/boost line. The injection controller 122 computes the output pulse width according to the desired parameters defined during programming and outputs the pulse width to the injector 124, which injects the desired amount of hydrogen gas received on the supply line 123 into the injection line 125. In one embodiment, the injector 124 injects the hydrogen gas directly into an intake manifold of the engine 150. This may vary based on the type of engine. For example, there may be other intervening components of the fuel system. For example, the injector 124 may inject the hydrogen gas into a dryer before the intake manifold. Most diesel engines, for example, are induced on the return side of the air-to-air cooler nearest the intake manifold. Most gasoline engines are induced into a spacer plate, which is installed directly on top of the manifold. In most cases, these types of engines utilize a threaded fitting to which the injection line 125 (e.g., stainless steel line) can couple.

The hydrogen fuel generator 110 is coupled to a power source, such as the existing engine battery 160 or the alternator power supply. Alternatively, other types of power sources may be used as would be appreciated by those of ordinary skill in the art having the benefit of this disclosure. The main power from the battery 160 may be routed through an automatic re-settable circuit breaker 161 and a control relay 162 for operation and protection. The positive terminal of the battery 160 can be coupled to the control relay 162 using a wire (e.g., 8-gauge), and the load side of the control relay 162 can be coupled to the positive terminal of the hydrogen fuel generator 110 (e.g., coupler coupled to the anode). The negative terminal of the battery 160 can be coupled to a mounting bolt of the hydrogen fuel generator 110. The negative control terminal of the relay 162 is connected to the positive terminal of the cycle switch 140 using a wire, while the negative terminal of the cycle switch 140 is coupled to the mounting bolt of the hydrogen fuel generator 110, which is coupled to the negative terminal of the battery 160. The relay 162 may also receive power from a positive ignition source, as well as an optional oil pressure control from a cycle switch (not illustrated). In the case of the positive ignition source, a wire (e.g., 14-gauge) can couple the keyed ignition power source to the positive control terminal of the relay 162. Alternatively, other power configurations are possible based on the engine's existing electrical configuration as would be appreciated by one of ordinary skill in the art having the benefit of this disclosure. The control side of the relay's circuitry may be activated by a switched ignition power source to ensure the hydrogen fuel generator 110 is only active during operation of the engine. It should be noted that the hydrogen fuel generator 110 can be wired in other configurations as would be appreciated by those of ordinary skill in the art having the benefit of this disclosure.

As depicted in FIG. 1, the injection control system may also be powered by the engine's battery 160 and may be independently fused to ensure over current protection. Alternatively, the injection control system can be powered using other configurations as would be appreciated by one of ordinary skill in the art having the benefit of this disclosure.

In one embodiment, the hydrogen fuel generator 110 includes an adjustable pressure cycle switch 140, which is utilized to precisely regulate the pressure within the hydrogen fuel generator 110 that is produced during the hydrogen manufacturing process. In another embodiment, the entire outer housing is equipped with an atmospheric discharge valve 111 (labeled as safety valve) as a secondary safety measure to prevent over pressurization of the hydrogen fuel generator 110. Alternatively, other safety mechanisms can be used in connection with the hydrogen fuel generator 110.

Additional details regarding the hydrogen fuel generator 110 are described below with respect to FIGS. 2, 3A, 3B, 4A, 4B, and 4C. Additional details regarding the injection control system are described below with respect to FIGS. 5A, 5B, and 6.

Figure 2:
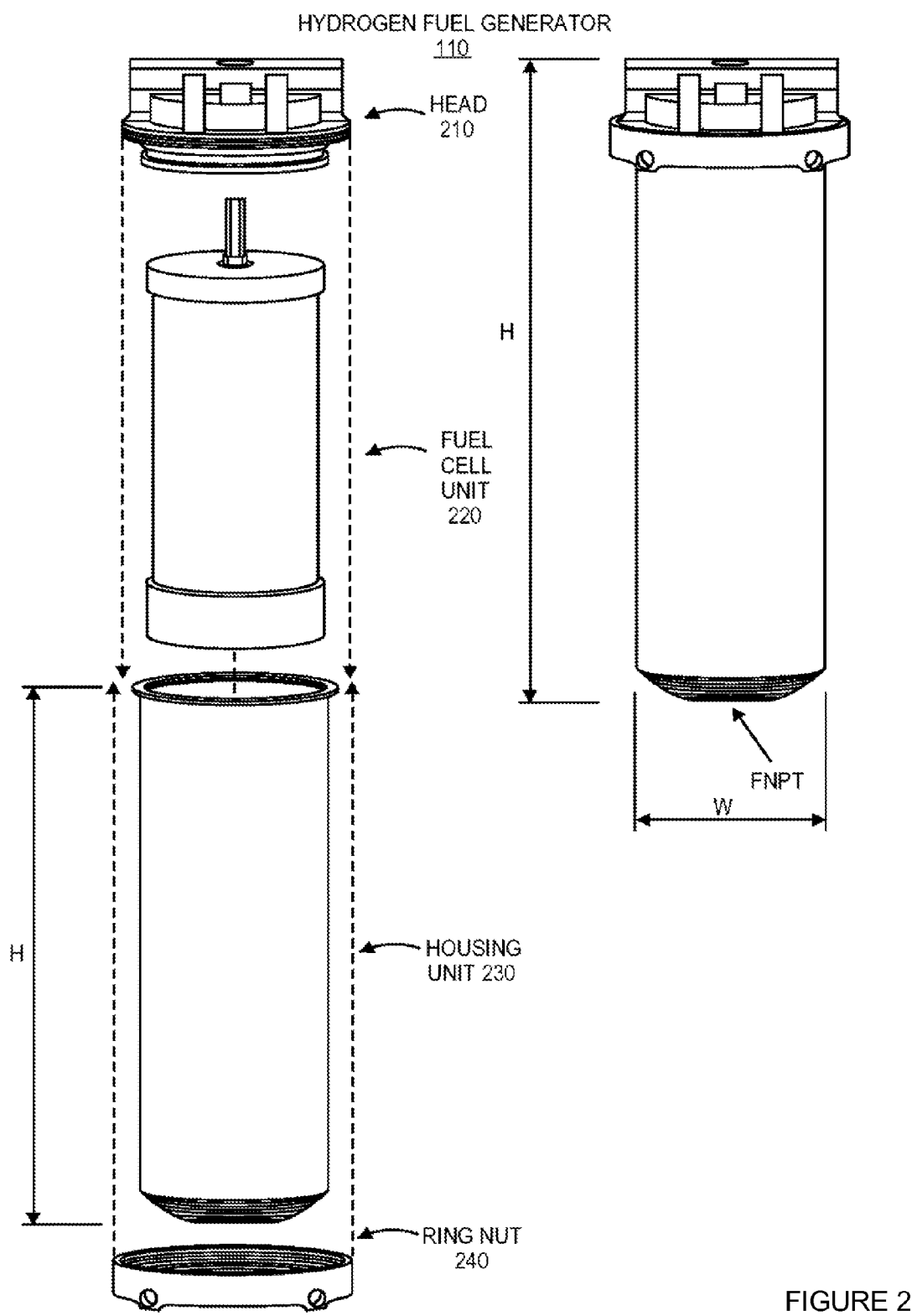
FIG. 2 is a side-view diagram of the hydrogen fuel generator of FIG. 1, including a fuel cell unit, according to one embodiment.

FIG. 2 is a side-view diagram of the hydrogen fuel generator 110 of FIG. 1, including a fuel cell unit 220, according to one embodiment. The hydrogen fuel generator 110 includes a head 210, the fuel cell unit 220, a housing unit 230, and a ring nut 240.

The head 210 includes an opening (and corresponding cap and fitting) for filling the hydrogen fuel generator 110 with the aqueous electrolyte solution. The solution may be water or may be a water solution having electrolyte. Electrolyte is a substance that when dissolved in a suitable solvent, such as water, or when fused becomes an ionic conductor. Electrolytes are used in the hydrogen fuel generator 110 to conduct electricity between the anode and cathode. The electrolyte may be used to provide increased efficiency of the electrolysis reaction. The solution may be adjusted to remain in a liquid solution form and not freeze at extremely low temperatures as would be appreciated by one of ordinary skill in the art having the benefit of this disclosure. The head 210 may be threaded to allow coupling with the ring nut 240 in order to fasten the head 210 to the housing unit 230. The head 210 includes another opening in which the check valve 113 may be disposed. Alternatively, the check valve 113 may be disposed in other locations. The check valve 113 (illustrated in FIG. 1) can be adjusted to release the hydrogen gas generated by the fuel cell unit 220 when a specified pressure has been reached. In one embodiment, the check valve 113 is adjusted to 20 pounds per square inch (psi). In other embodiments, the check value 113 may be set to other pressure levels. In one embodiment, the check valve 113 and the outer housing of the hydrogen fuel generator 110 is tested and rated to ensure 300% safety margin over the maximum operating pressures, such as between 20 to 100 psi. In one embodiment, by setting the check valve 113 to be set at 20 psi on the lower end of the range, the hydrogen fuel generator 110 does not go all the way down to zero psi. This may allow faster delivery of the hydrogen gas to the engine 140. The check valve's purpose may include maintaining a minimum pressure level when the system is not in use. This in-turn assists in the production of hydrogen gas returning to optimum pressure at a faster rate. The check valve 113 may also aid in the elimination of water/electrolyte solution traveling through the supply line 127 to the receiver/dryer 130. The head 210 may also include the adjustable pressure cycle switch 140, which is utilized to precisely regulate the pressure within the hydrogen fuel generator 110 that is produced during the hydrogen manufacturing process. Alternatively, the adjustable pressure cycle switch 140 may be disposed in other locations on the hydrogen fuel generator 110, or elsewhere in the fuel system. In another embodiment, the head 210 is equipped with an atmospheric discharge valve (e.g., safety valve 111) as a secondary safety measure to prevent over pressurization of the hydrogen fuel generator 110. The head 210 may also include a terminal to be coupled to a negative terminal of the battery 160, as illustrated in FIG. 1.

When coupled to the negative terminal of the battery 160, the entire outer housing of the hydrogen fuel generator 110, including the head 210, housing unit 230, and ring nut 240, operates as a first electrode, specifically the cathode for electrolysis. In one embodiment, the housing unit 230 is a cylindrical enclosure of metal. In one embodiment, the housing unit 230 is stainless steel. In one exemplary embodiment, the stainless steel 316 grade is used. The head 210, housing unit 230, and the ring nut 240 may be stainless steel. Alternatively, other grades of stainless steel or different metals may be used for the different parts of the hydrogen fuel generator 110. The outer housing 230 may include an opening at the bottom to allow the aqueous solution to be drained from the housing unit 230. In one embodiment, the housing unit 230 includes a female national pipe thread (FNPT) (e.g., ¼" FNPT) to allow a drain valve to be screwed into the bottom of the housing unit. In one embodiment, the housing unit 230 is approximately 10.375 inches in height (H), 3.375 inches in width (W) (diameter), and the overall height (H) of the hydrogen fuel generator 110 is approximately 12 inches. In one embodiment, the diameters (D) of the cylindrical tubular cells 310 and 320 are 1.0 inches, 1.5 inches, 2.0 inches, 2.5 inches, and 3.0 inches, respectively from the innermost tube 320 to the outer tube 310. In other embodiments, other diameters (D) may be used. In one embodiment, each of the outer tube 310 and inner tubes 320 has a thickness of 0.060 inches. Alternatively, other thicknesses may be used. In another embodiment, the housing unit 230 is approximately 20 inches in height (H), 3.375 inches in width (W) (diameter), and the overall height (H) of the hydrogen fuel generator 110 is approximately 22 inches. In another embodiment, the overall height (H) of the hydrogen fuel generator 110 is between approximately 10 inches to 36 inches, and the overall width (W) is between approximately 3 inches to 8 inches. Alternatively, other dimensions may be used based on various factors, such as the size of the engine, the space available for installing the hydrogen fuel generator 110, amount of hydrogen gas needed, etc, the amount of voltage of the power source (e.g., 12V, 24V, or the like) as would be appreciated by one of ordinary skill in the art having the benefit of this disclosure.

The fuel cell unit 220 is disposed within the cylindrical enclosure 230, and includes multiple conductive tubular cells disposed in a longitudinal direction of the cylindrical enclosure 230 and a metal rod disposed within the conductive tubular cells along a longitudinal axis of the cylindrical enclosure 230. When coupled to the positive terminal of a power source (e.g., the battery 160), the metal rod operates as a second electrode, specifically the anode for electrolysis. Unlike the alternating bi-polar plates described in the conventional systems, the conductive tubular cells of the embodiments described herein are passive conductors and are not coupled to the negative and positive terminals. In one embodiment, the fuel cell unit 220 includes one outer tube and one or more inner tubes, for example, three inner tubes, or four inner tubes. In another embodiment, the metal rod is a metal bolt, such as a stainless steel bolt, disposed within the innermost tube of the one or more inner tubes. The metal bolt may be used to fasten the fuel cell unit 220 together as described in more detail below. Alternatively, the metal rod may be other types of metal and may or may not be used to fasten the fuel cell unit 220 together. In another embodiment, the innermost tube is connected to the positive terminal and operates as the anode. For example, the innermost tube may have threads to fasten to the lid and base.

In one embodiment, the power source is approximately 12 volts. In another embodiment, the power source is approximately 24V. When using 24 volts, the dimensions of the fuel cell unit 220 may be changed. For example, the height (H) dimensions of the fuel cell unit 220 (e.g., height (H) of the conductive tubular cells) may be twice as big as the dimensions for the fuel cell unit 220 that operates at 12 volts, while the diameters and placement of the conductive tubular cells may remain substantially unchanged. The dimensions of the fuel cell unit 220 may also be affected based on the total surface area of the conductive tubular cells. For example, in some embodiments, the conductive tubular cells may have holes to have approximately 52% to 65% total surface area, leaving between approximately 35% to 48% open surface area on the conductive tubular cells. In one exemplary embodiment, the conductive tubular cells have 40% open surface area. When the dimensions of the conductive tubular cells change, the appropriate amount of holes may be made in the fuel cells to provide approximately 40% of the open surface area. Alternatively, when other voltages are used, the dimensions of the fuel cell units may vary accordingly in order to generate and maintain the appropriate currents for proper operation.

Figure 3A:
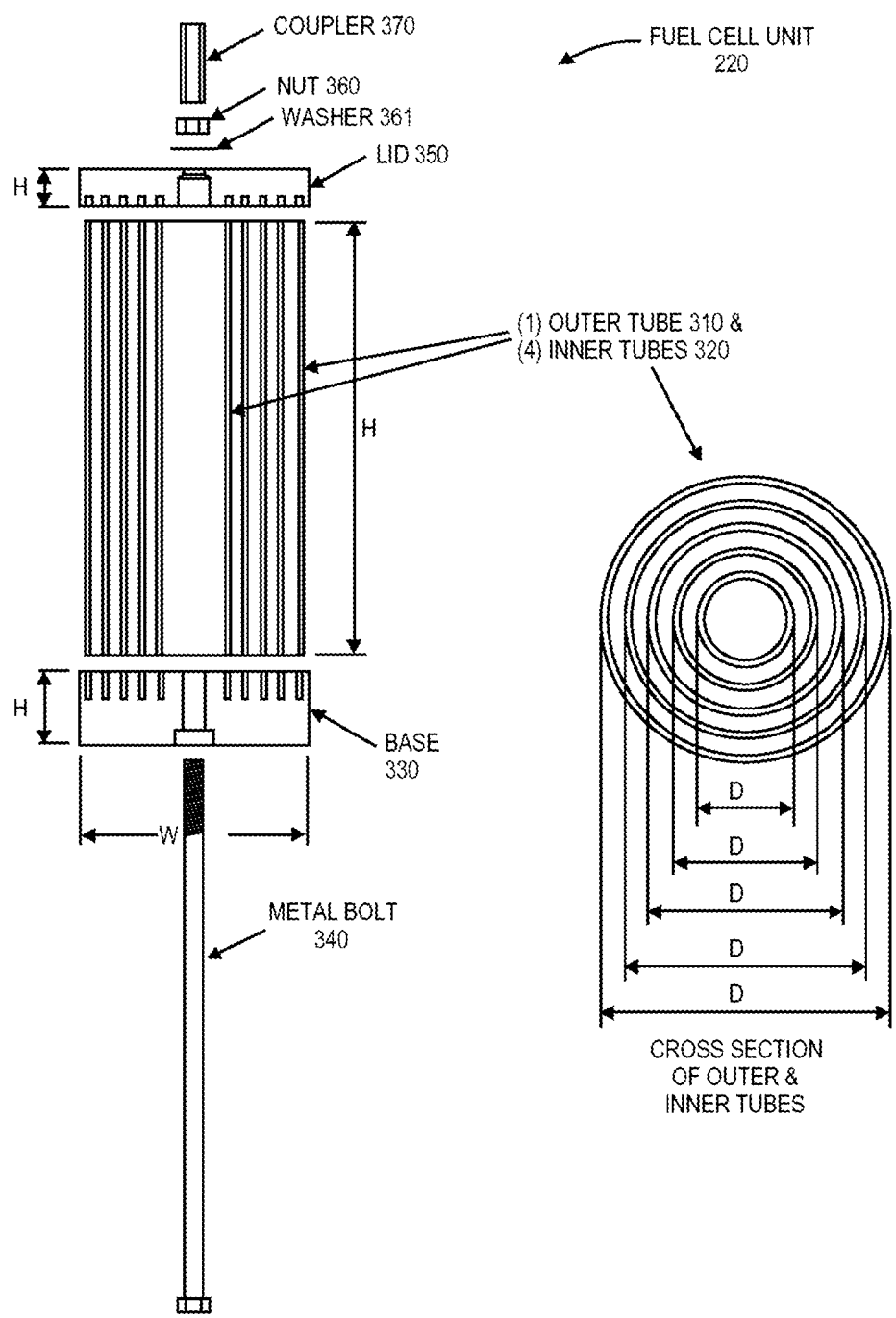
FIG. 3A is a diagram illustrating a side-view and a cross-section view of the fuel cell unit of FIG. 2 according to one embodiment.

FIG. 3A is a diagram illustrating a side-view and a cross-section view of the fuel cell unit 220 of FIG. 2 according to one embodiment. The fuel cell unit 220 includes one outer tube 310 and four inner tubes 320. In another embodiment, the fuel cell unit 220 includes one outer tube 310 and the innermost tube of the four inner tubes 320 is optional, totaling four tubes, one outer tube and three inner tubes. In one embodiment, the outer and inner tubes 310 and 320 are stainless steel. Alternatively, other types of metal may be used as described herein.

The outer and inner tubes 310 and 320 are coupled to a non-metal base 330, which arranges the inner tubes 310 and 320 to be electrically isolated from one another. In another embodiment, the non-metal base 330 are configured to space the tubes 310 and 320 at specified distances from one another, such as at approximate fixed distances or the same approximate distances from one another. In one exemplary embodiment, as shown in the cross-section view, the outer tube 310 is approximately 3 inches, and the inner tubes 320 are approximately 2.5", 2.0", 1.5", and 1", respectively. As stated above, the innermost tube 320 of approximately 1" may be optional. Alternatively, other dimensions may be used based on various factors, such as the size of the engine, the space available for installing the hydrogen fuel generator 110, amount of hydrogen gas needed, etc, as would be appreciated by one of ordinary skill in the art having the benefit of this disclosure. In one embodiment, the outer and inner tubes 310 and 320 are 0.075 gauge tubes. In another embodiment, the outer and inner tubes 310 and 320 have a height between approximately 4 inches and 30 inches, and a width between approximately 1 inch and 7½ inches. The non-metal base 330 and a non-metal lid 350 may be PTFE isolators at the top and bottom to support and stabilize the outer and inner tubes 310 and 320. In one embodiment, the non-metal base 330 and non-metal lid 350 have a thickness between approximately ½ inch and 3 inches, and the diameter is approximately ½ inch less than the respective housing dimensions in FIG. 2. Alternatively, other dimensions may be used. In one embodiment, the non-metal base 330 and lid 350 have circular grooves in which the tubes fit to support the tubes at the specified distances. These circular tubes isolate the tubes from one another and the spacing between the tubes affects the current generated by electrolysis. The non-metal base 330 and lid 350 may each have a hole through which a metal bolt 340 (e.g., stainless steel bolt) passes to secure the entire inner assembly. The metal bolt 340 passes through the base 330, innermost tube, and lid 350 to be secured to a nut 360 (with or without the washer 361). In another embodiment, the metal bolt 340 bonds to the innermost tube, thus creating a larger anode surface area. For example, the top of the innermost tube may include a surface having a threaded hole to which the metal bolt 340 bonds disposed within the innermost tube. The remaining tubes (e.g., 3 of 4 tubes) are passive conductors that are neutral and have no physical bond to the anode or the cathode (e.g., the entire outer housing).

In one embodiment, the metal rod 340 and nut 360 are coupled to a coupler 370, which is coupled to the positive terminal of the power source. In one embodiment, the coupler 370 passes through the opening of the head 210 to be coupled to the positive terminal. In another embodiment, the coupler 370 is coupled to a threaded stud that passes through the opening. The threaded stud is secured to the head 210 with PTFE insulator and corresponding nut. Alternatively, other types of coupling between the positive terminal of the power source and the metal bolt 340 may be used.

Figure 3B:
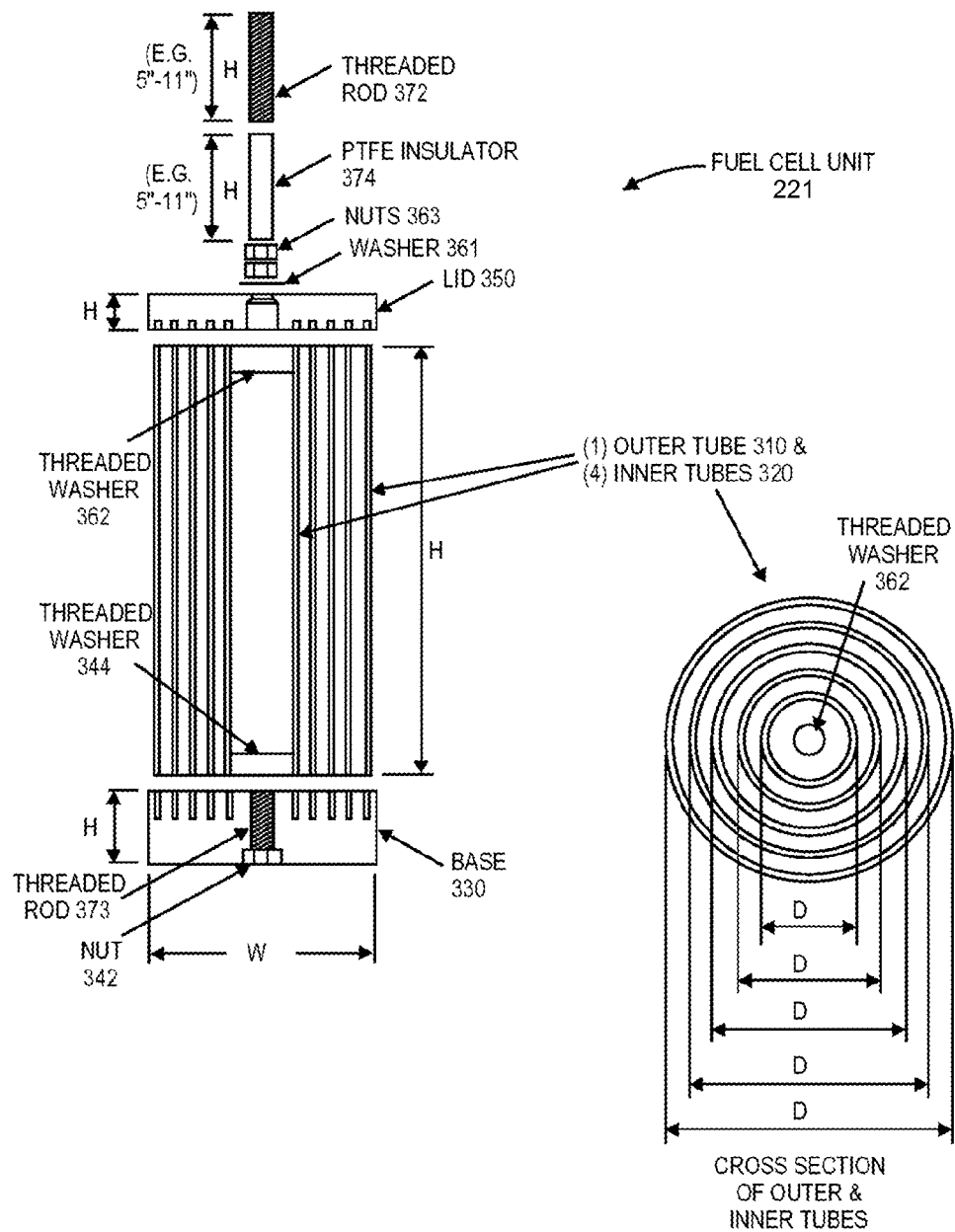
FIG. 3B is a diagram illustrating a side-view and a cross-section view of the fuel cell unit of FIG. 2 according to another embodiment.

FIG. 3B is a diagram illustrating a side-view and a cross-section view of the fuel cell unit 221 of FIG. 2 according to another embodiment. The fuel cell unit 221 is similar to the fuel cell unit 220 of FIG. 3A as noted by similar reference labels. As described above, the fuel cell unit 220 includes the metal bolt 340 that passes through a hole in the base 330 up through the innermost tube 320, through a hole in the lid 350 to be secured by the nut 360 and coupler 370. This design is used to secure the cylindrical tubular cells between the lid 350 and the base 330, and uses the bolt 340 as an anode disposed within the cylindrical tubular cells.

Referring to FIG. 3B, instead of using the metal bolt 340, the fuel cell unit 221 uses a threaded rod 372 to be secured to the innermost tubular cell (innermost one of the tubes 320) at the top and a threaded rod 373 to be secured to the innermost tubular cell at the bottom. In particular, a threaded washer 362 is secured (e.g., welded) to the top of the innermost tube 320, and a threaded washer 344 is secured (e.g., welded) to the bottom. The threaded washers 362 and 344 have a hole through which the threaded rods 372 and 373 can be threaded. The threaded rods 372 and 373 can be threaded into the innermost tube 320 by a specified amount to secure the respective rode to the innermost tube 320. This allows the innermost tube 320 to be open (or hollow) throughout most of the height (H) of the innermost tube 320. The threaded rod 373 is secured to the nut 342 at the bottom, and the nut 342 can be semi-permanently or permanently secured to the bottom of the base 330 or to the threaded rod 473, such as by welding. The innermost tube 320 and threaded rods 372 and 373 become a single component that is secured to the base 330 and the lid 350, and can be used as the anode, instead of the bolt 340. The threaded rod 372 is secured to the lid 350 using two nuts 363 and a washer 361. Since the lid 350 may be made of softer material than metal, two nuts 363 can be used to provide additional stability to the threaded rod 372 and the innermost tube 320 within the fuel cell unit. The threaded rod 372 is secured to the head 210, such as by being welded. The threaded rod 372 can be secured to the head 210 before or after being secured to the innermost tube. In one embodiment, the threaded rod 372 is between approximately 5 inches and 11 inches, based on the size of the fuel cell unit. The threaded rod 373 may be between ½ and ¾ inch depending on the height of the base 330. The threaded rods 372 and 373 may be stainless steel, such as 316 grade. In one embodiment, the threaded rods 372 and 373 are ¼-20 rods. Alternatively, other dimensions and other types of metals may be used for the threaded rod 372 and for the threaded rod 373 as would be appreciated by one of ordinary skill in the art having the benefit of this disclosure.

At the top of the fuel cell unit 221, a PTFE insulator 374 can be disposed above the lid 350 can insulate the threaded rod 372. The PTFE insulator 374 prevents exposure of the metal to reduce or eliminate arcs caused from being exposed. In one embodiment, the PTFE insulator 374 may be between approximately 5 inches and 11 inches in height (H) and is disposed to cover the threaded rod 372. Of course, the height of the PTFE insulator 374 may vary based on the height of the threaded rod 372. It should be noted that although the depicted insulator 374 is PTFE, other types of materials may be used. This embodiment removes the coupler 370 and the metal bolt 340.

Figure 4A:
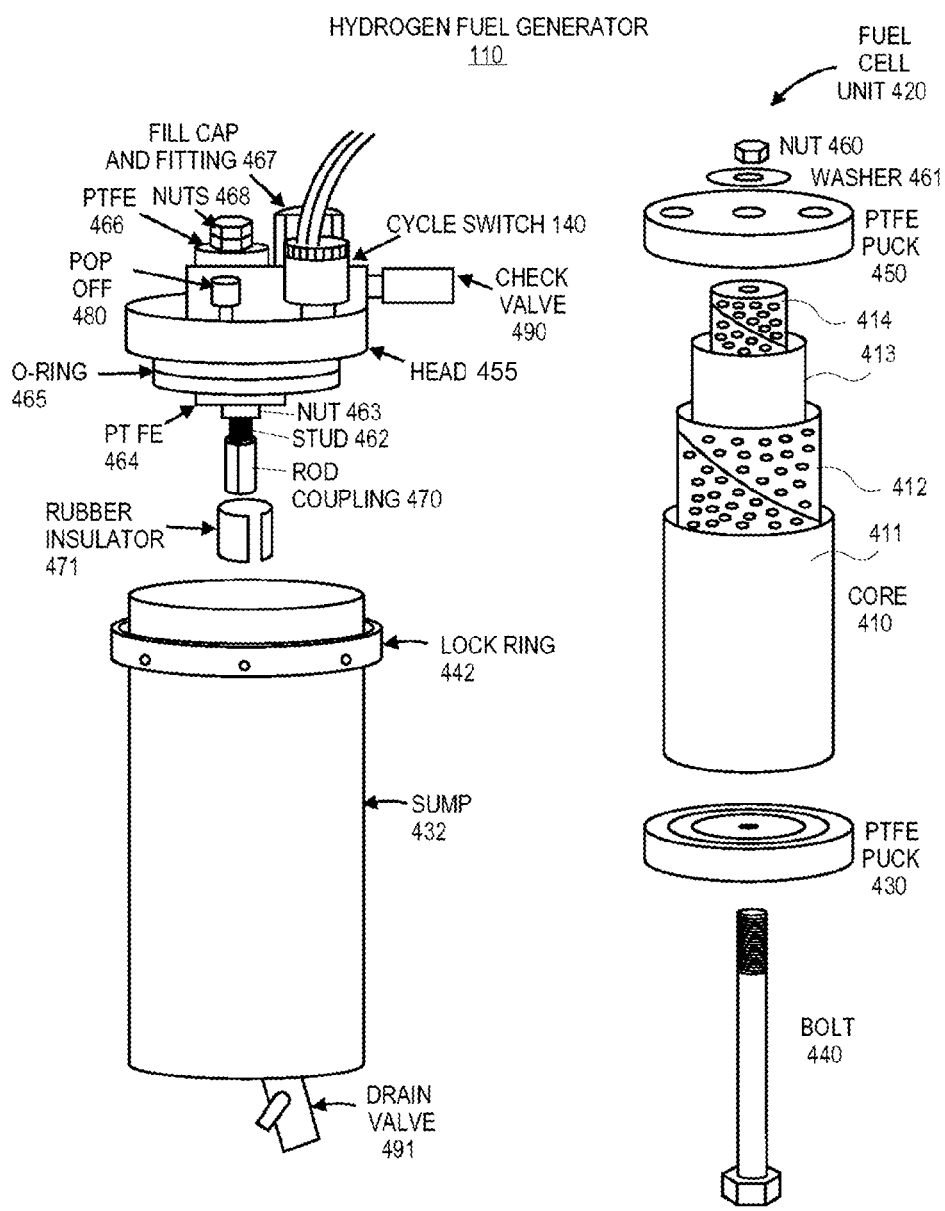
FIG. 4A illustrates another embodiment of the hydrogen fuel generator of FIG. 1.

FIG. 4A illustrates another embodiment of the hydrogen fuel generator 110 of FIG. 1. In this embodiment, the hydrogen fuel generator 110 includes a fuel cell unit 420. The fuel cell unit 420 has an inner core 410 having four tubes 411-414. Within the outer tube 411 are disposed three inner tubes 412-414, each opposing tube has holes in the outer cylindrical surfaces, beginning with the anode bolt 440, which is bonded with the innermost tube 414. In one embodiment, the holes are equally spaced. Alternatively, other patterns may be used for the holes. The holes increase the surface area of metal exposed to the aqueous solution. In one embodiment, the holes are drilled to optimize the reactive surface. In one exemplary embodiment, the holes are 1/8" holes drilled on 3/16" staggered centers. This configuration may be modified to increase or decrease the reactive surface, which affects the current draw of the core design. In this embodiment, the innermost tube 414 and the inner tube 412 have holes. Alternatively, other patterns can be used, such as all of the tubes have holes, or all of the tubes except the outer tube 411.

In another embodiment, the inner core tubes 411-414 include microscopic indentations on its surfaces. In one embodiment, all surfaces of the inner core tubes 411-414 include microscopic indentations. In another embodiment, less than all surfaces of the inner core tubes 411-414 include microscopic indentations. In one embodiment, the microscopic indentations are manufactured using abrasive blasting. Abrasive blasting is the operation of forcibly propelling a stream of abrasive material against the surface under high pressure to make the microscopic indentations on the surfaces of the inner core tubes 411-414. There are several variations of abrasive blasting, such as, for example, sand blasting, bead blasting, shot blasting, and sodablasting. In another embodiment, the microscopic indentations may be made using other techniques as would be appreciated by one of ordinary skill in the art having the benefit of this disclosure.

In another embodiment, the inner core tubes 411-414 include microscopic indentations and holes as depicted in FIG. 4A. The microscopic indentations, like the holes, increase the amount of reactive surface exposed to the aqueous solution, which further increases the excitation of hydrogen molecules, which consequently increases the efficiency of the electrolysis towards optimal hydrogen gas production.

In another embodiment, the inner core tubes 411-414 can be disparate materials. For example, the outer tube 411 and the inner tube 413 may be stainless steel and the inner tubes 412 and 414 may be titanium. The disparate metals may also increase the excitation of hydrogen molecules, increasing the efficiency of the electrolysis. In other embodiments, other combinations of different metal types may be used, such as stainless steel and other metals with similar characteristics as titanium. In one embodiment, embodiment, the inner core tubes 411-414 includes holes, microscopic indentations, and alternating metals. Alternatively, the inner core tubes 411-414 may include any combination thereof.

The inner core 410 also includes PTFE pucks 430 and 450 as the base and lid of the inner core 410. The PTFE pucks 430 and 450 include grooves in which the tubes 411-414 fit to support and maintain the tubes 411-414 in their respective positions, such as at fixed distances from one another. The PTFE puck 430 includes a hole through which the bolt 440 may be disposed. The bolt 440 passes through the PTFE puck 430, the innermost tube 414 and through a hole of the PTFE puck 450 to be secured by the washer 461 and nut 460. In another embodiment, the pucks 430 and 450 are high-density polyethylene (HDPE) pucks. Alternatively, other polyethylene thermoplastics may be used.

In one embodiment, the inner core 410 is coupled to a head 455 of the hydrogen fuel generator 110 via a rod coupling 470. A rubber insulator 471 may be placed around the rod coupling 470 and the nut 460 to insulate the anode connection. Alternatively, other types of insulators may be used. The rod coupling 470 is coupled to the stud 462, such as a continuous-thread stud (e.g., 1/4"-20). The nut 463 secures the stud 462 on the one side of the head 455 and the nut(s) 468 secure the stud 462 on the other side of the head 455. The nuts 468 can be insulated with PTFE insulators 464 and 466, respectively. The PTFE insulator 466 and stud 426 are also illustrated in the top-view of FIG. 4B. An o-ring 465 can be disposed on the head 455 to help provide a seal between the head and the lock ring 442, which is secured to the sump 432. The sump 432 can be filled with the aqueous solution through the fill cap 467. In one embodiment, the sump 432 is implemented as a wet sump, which has the sump 432 as the only reservoir to be filled with the aqueous solution (e.g., water and electrolyte). In another embodiment, the sump 432 is implemented as a dry sump having an external reservoir that is filled with the aqueous solution and a pressure pump is used to pump the solution into the sump 432.

Figure 4B:
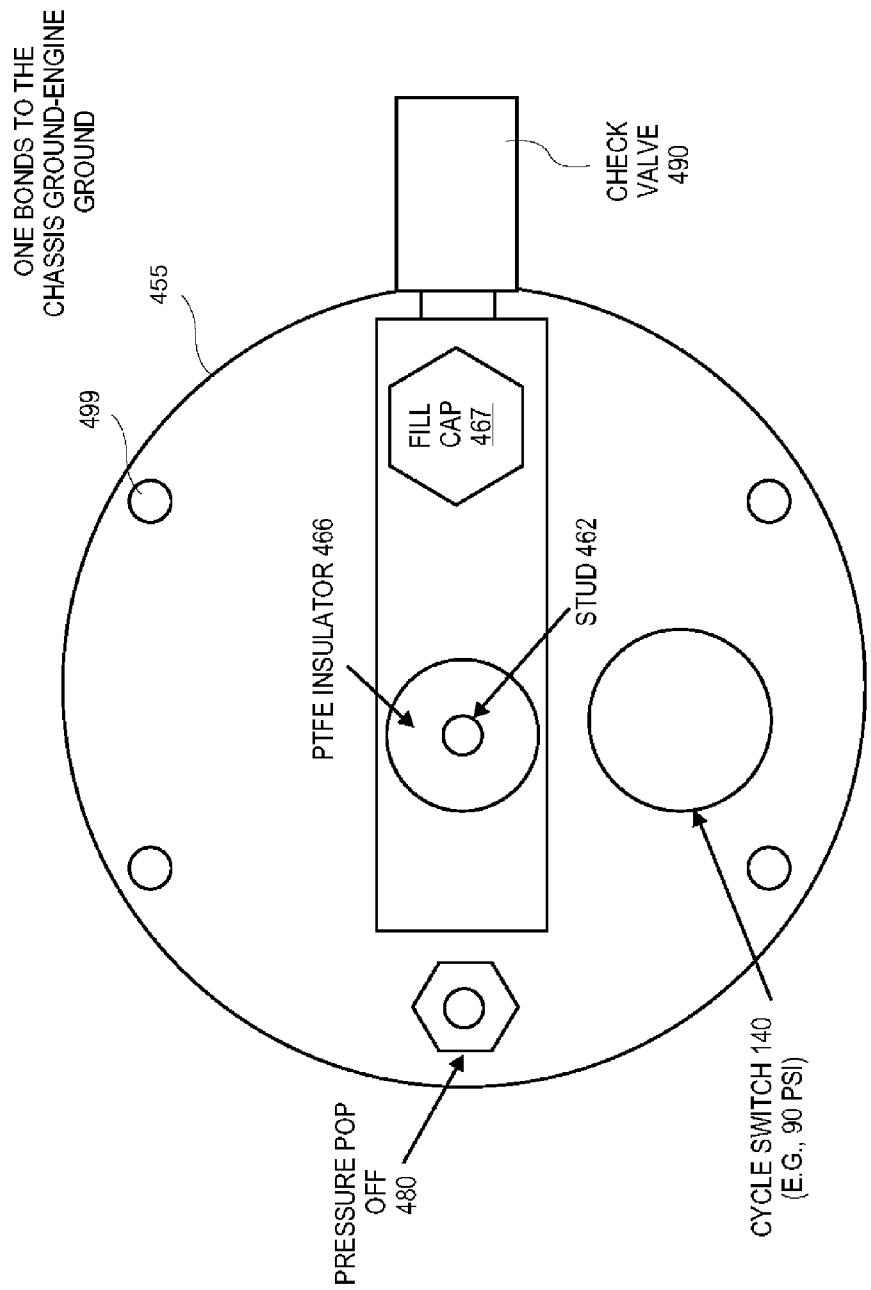
FIG. 4B is a top-view of the hydrogen fuel generator of FIG. 4A.

In another embodiment, such as depicted in FIGS. 4A and 4B, the head 455 also includes a pressure pop off valve 480, such as an atmospheric discharge valve that can be adjusted, for example, to the maximum operating pressure of the hydrogen fuel generator 110 (e.g., 200 psi). The head 455 also includes an adjustable pressure cycle switch 490, which is utilized to precisely regulate the pressure within the hydrogen fuel generator 110 that is produced during the hydrogen manufacturing process. In one embodiment, the cycle switch 490 is adjusted to operate at approximately 90 psi with a 3-psi variance. Alternatively, the cycle switch 490 can be set to other pressure levels based on the design. In other embodiments, the adjustable pressure cycle switch 490 may be disposed in other locations on the hydrogen fuel generator 110. Also, the adjustable pressure cycle switch 490 may be disposed in other locations in the fuel system. For example, a fuel system that includes multiple hydrogen fuel generators, a single adjustable pressure cycle switch 490 can be disposed, for example, a dryer, or at another location and control each of the multiple fuel generators.

In one embodiment, the head 455 also includes a fill cap and fitting 467, through which the sump 432 can be filled with the aqueous solution. In addition, the sump 432 may include a drain valve 491, through which the aqueous solution can be drained from the sump 432. Alternatively, the hydrogen fuel generator may include more or less components in order to supply the aqueous solution to the hydrogen fuel generator.

In the depicted embodiment, the head 455 also includes the check valve 490 that allows the hydrogen gas to be delivered to the receiver/dryer 130 via the supply line 127. Like the check valve 113, the check valve 490 prevents back flow of fluids into the hydrogen fuel generator 110. As described herein, the check valve 490 may operate as a safety mechanism, and other safety mechanisms may be used.

As depicted in FIG. 4B, the head 455 includes at least one terminal 499 (e.g., one of the four mounting bolts depicted as circles in FIG. 4B) at which the entire outer housing of the hydrogen fuel generator 110 can be connected to a negative terminal of the power source, such as the battery 160. In another embodiment, the terminal on the head 455 can be coupled via a wire to the metal chassis or the engine ground, which is connected to the negative supply terminal of the battery 160.

Figure 4C:
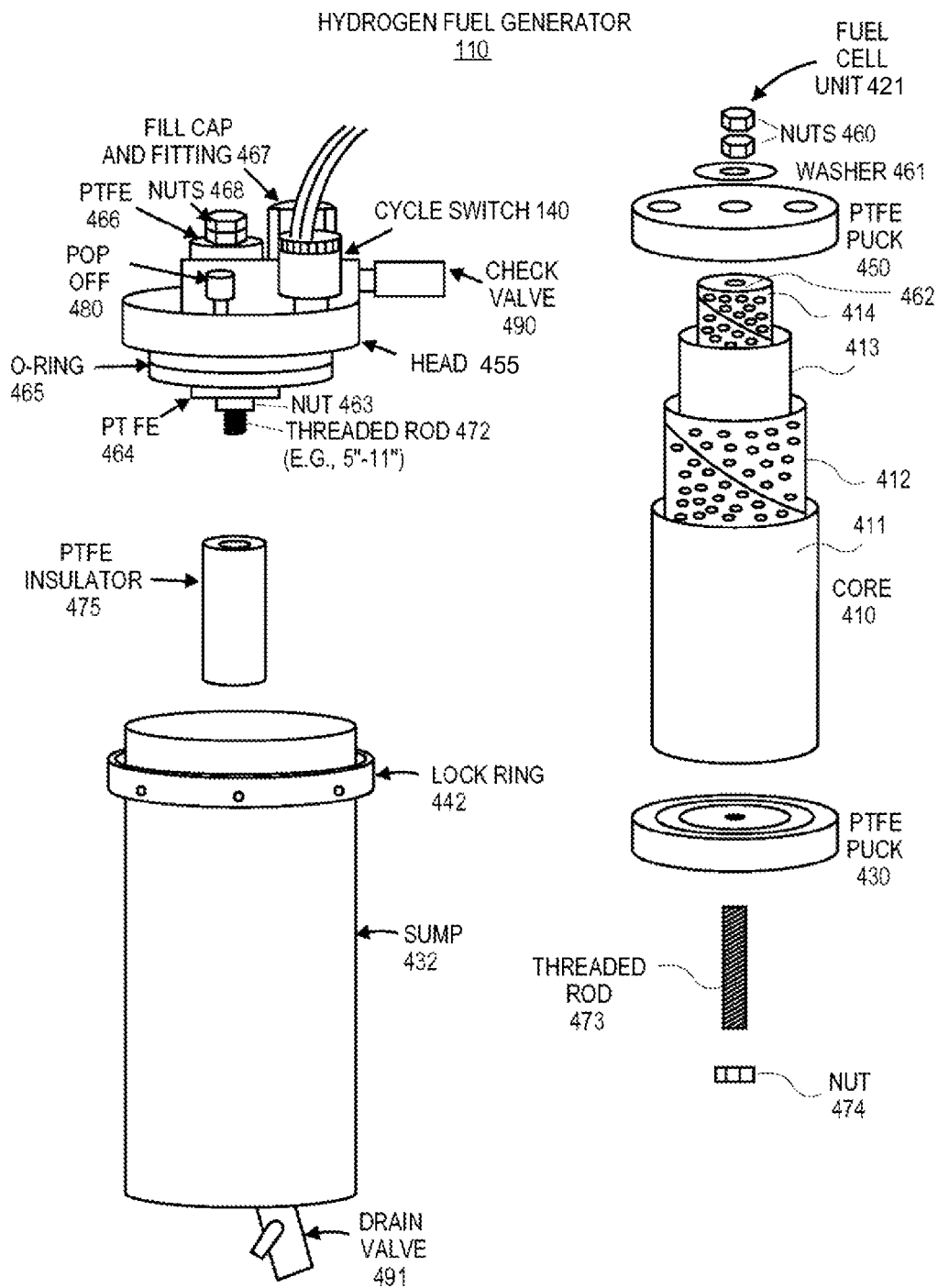
FIG. 4C illustrates another embodiment of the hydrogen fuel generator of FIG. 1.

FIG. 4C illustrates another embodiment of the hydrogen fuel generator of FIG. 1. The fuel cell unit 421 is similar to the fuel cell unit 420 of FIG. 4A as noted by similar reference labels. As described above, the fuel cell unit 420 includes the metal bolt 440 that passes through a hole in the PTFE puck 340 up through the innermost tube 414, through a hole in the PTFE puck 450, washer 461, and is secured by the nut 460. Also, the fuel cell unit 420 includes a rubber insulator 471 and rod coupling 470 to secure and electrically couple the bolt 440 (and nut 46) to the stud 462 of the head 455. This design is used to secure the cylindrical tubular cells between the pucks 430 and 450, and uses the bolt 440 as an anode disposed within the cylindrical tubular cells.

Referring to FIG. 4C, instead of using the metal bolt 340, the fuel cell unit 421 uses a threaded rod 472 to be secured to the innermost tubular cell (innermost one of the tubes 414) at the top and a threaded rod 473 to be secured to the innermost tubular cell at the bottom. In particular, a threaded washer 462 is secured (e.g., welded) to the top of the innermost tube 414, and a threaded washer (not illustrated) is secured (e.g., welded) to the bottom. The threaded washers have a hole through which the threaded rods 472 and 473 can be threaded. The threaded rods 472 and 473 can be threaded into the innermost tube 414 by a specified amount to secure the respective rode to the innermost tube 414. This allows the innermost tube 414 to be open (or hollow) throughout most of the height (H) of the innermost tube 414. The threaded rod 473 is secured to the nut 474 at the bottom, and the nut 474 can be semi-permanently or permanently secured to the threaded rod 473, such as by welding. The innermost tube 414 and threaded rods 472 and 473 become a single component that is secured to the pucks 430 and 450, and can be used as the anode, instead of the bolt 440. The threaded rod 472 is secured to the puck 450 using two nuts 460 and a washer 461. The two nuts 460 can provide stability to the innermost tub and threaded rods. The threaded rod 472 is secured to the head 455, such as by being welded before or after being secured to the innermost tube 411. Like above, the threaded rod 472 may be between approximately 5 inches and 11 inches, based on the size of the fuel cell unit. The threaded rod 473 may be between ½ and ¾ inch depending on the height of the puck 430. The threaded rods 472 and 473 may be stainless steel, such as 316 grade. In one embodiment, the threaded rods 472 and 473 are ¼-20 rods. Alternatively, other dimensions and other types of metals may be used for the threaded rod 472 and for the threaded rod 473 as would be appreciated by one of ordinary skill in the art having the benefit of this disclosure.

At the top of the fuel cell unit 480, a PTFE insulator 475 can be disposed above the PTFE puck 450 can insulate the threaded rod 472. The PTFE insulator 475 prevents exposure of the metal to reduce or eliminate arcs caused from being exposed. In one embodiment, the PTFE insulator 475 may be between 5 inches and 11 inches in height (H) and is disposed to cover the threaded rod 472. Of course, the height of the PTFE insulator 475 may vary based on the height of the threaded rod 472. It should be noted that although the depicted insulator 475 is PTFE, other types of materials may be used. This embodiment removes the rod coupling 470, and rubber insulator 471, as used in the fuel cell unit 410. In some cases, the rubber insulator 471 may melt or change shape due to temperatures within the fuel cell unit. The melted or changed shape of the rubber insulator 471 may cause arcing by exposing portions of the metal. The embodiments that use the innermost tube as the anode may avoid this problem.

Figure 5A:
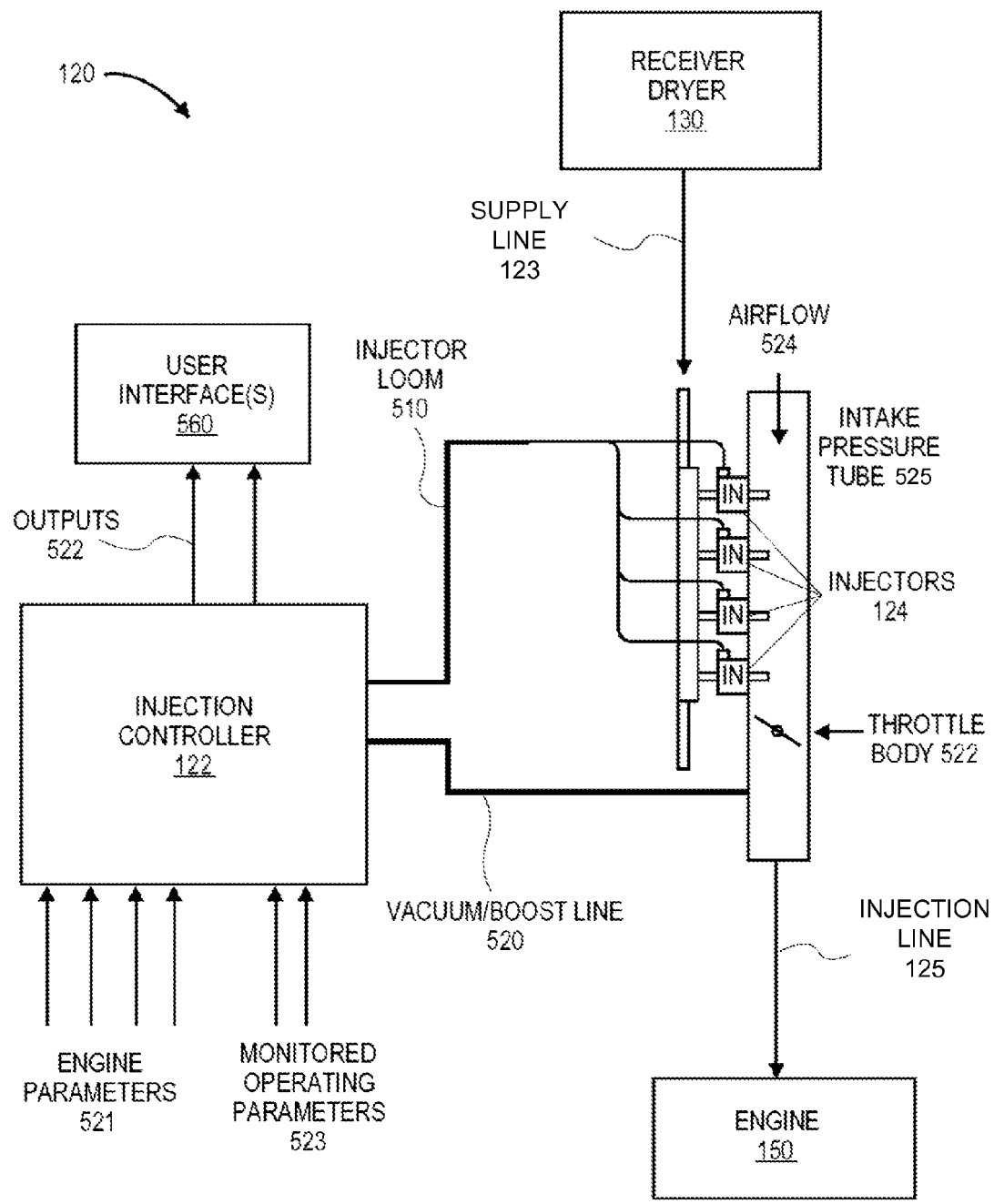
FIG. 5A is a block diagram of one embodiment of an injection control system.

FIG. 5A is a block diagram of one embodiment of an injection control system 120. The injection control system 120 includes the computerized injection controller 122 and one or more injectors 124 as depicted in FIG. 1. The one or more injectors 124 can be high-impedance injections or low-impedance injectors. The injection control system 120 regulates the flow of hydrogen gas from the supply line 123 from the receiver/dryer 130 to the injection line 125 to the engine 150. The injection control system 120 may be programmable for each specific engine to calculate and deliver the desired amount of hydrogen gas to the engine to reduce emissions and increase fuel efficiency.

The injection controller 122 may be a stand-alone injection controller, which provides three-dimensional mappings of the flow of hydrogen induced, which is described in more detail below. In another embodiment, the injection controller 122 may be a component or a module of an engine management controller or other computing device associated with the engine 150, such as an on-board computer of a vehicle or of a machine using the engine 150. In one embodiment, the injection controller 122 is programmable, and may be programmed for the particular engine being used.

In one embodiment, the injection controller 122 provides precise hydrogen gas delivery to an internal combustion engine. A user can program the injection controller 122, providing the user a convenient way to set the mixture of hydrogen gas, air, and fuel injected into the combustion engine. The injection controller 122 can be programmed to deliver the desired amount of hydrogen gas to the engine to achieve a desired air/fuel ratio, to reduce emissions, and/or to increase mileage. In one embodiment, the user can access the injection controller 122 via an interface, such as a serial port or a USB port. The user can create a file, such as a configuration file that contains a three-dimensional map that includes multiple cell locations containing a value corresponding to the amount of hydrogen gas to deliver to the engine based on one or more factors as described herein. The configuration file may also include other settings that are used to control the injector 124. The file may also contain other settings that are used to control fuel delivery, ignition timing, Exhaust Gas Oxygen (EGO) sensor offset, and a variety of other engine parameters as would be appreciated by those of ordinary skill in the art having the benefit of this disclosure.

In one embodiment, the injection controller 122 receives one or more engine parameters 521, and can monitor one or more input connections that receive monitored operational parameters 523 from other components of the system, such as the tachometer, the injector loom, the vacuum/boost line, or the like. The engine parameters 521 may include boost pressure, vacuum pressure, or voltage from the engine's injector loom and vacuum/boost lines. The engine parameters 521 may also include revolutions per minute (RPM), such as from the engine's tachometer signal, respectively. In the depicted embodiment, the injection controller 122, via input connections, monitors the engine's tachometer signal, injector loom 510, the vacuum/boost line 520, the injector's pulse width or duty cycle, or the like, as the monitored operating parameters 423. The injector controller 122 varies the output pulse width of the injector 524 according to the desired parameters defined during the programming based on the monitored operational parameters 523. In another embodiment, the injection control system 120 can measure the engines cam-positioning sensor and throttle positioning sensor and varies the flow of hydrogen accordingly.

In one embodiment, the injection controller 122 uses the three-dimensional map, which includes cell locations that each contains a value that represents the injector's on-time or how much the injectors are pulsed. This value may represent the amount of time, for example, in milliseconds. For example, if one of the cell locations is filled with a value of 10, whenever the manifold boost pressure and RPM match one of those cell locations, the injectors will be pulsed for 10 milliseconds. In one embodiment, the injection controller 122 programs the injector pulse width directly into cell locations on a map defined by boost pressure and revolutions per minute. The three-dimensional map may be stored in memory, such as a non-volatile memory, or other types of memory or storage devices that are internal or external to the injection controller 122. Programming and calibration of the interrupt controller 122 may be achieved through a serial interface, which is active during engine operation. Alternatively, the injection controller 122 can use other techniques to control the injector 124, such as a look-up table (LUT), an algorithm, or dedicated hardware or software logic to compute the desired output to the injector 124 based on the engine parameters 521 and monitored operating parameters 523. It should also be noted that the three-dimensional map, LUT, algorithm or dedicated logic can be calibrated to adjust the injection controller's response to the engine parameters being monitored as would be appreciated by those of ordinary skill in the art having the benefit of this disclosure.

In the depicted embodiment, the injectors 124 receive the hydrogen gas from the supply line 123 from the receiver/dryer 130. The intake pressure tube 525 receives the airflow 524 and the injectors 124 inject the hydrogen gas into the airflow 524 as described above. The airflow with the hydrogen passes the throttle body 526 to the injection line 125 to the engine 150.

In the depicted embodiment, the injection controller 122 provides one or more outputs 522 to one or more user interface devices 560. The user interface device 560 may be a digital display, a meter, a graphical user interface on a display, or other types of user interface devices, such as those present on a dashboard or console of the vehicle or on a control panel associated with an engine used in another type of machine. The user interface device 560 may be a meter or digital display, indicating the performance of the supplementary fuel system, or specific aspects of the supplementary fuel system. The meter, for example, may indicate that supplementary fuel system is injecting hydrogen gas into the air-fuel mixture, the rate at which hydrogen gas is being injected, the resulting effect on the mileage by the hydrogen gas, and/or miles to empty based on the use of hydrogen gas. The injection controller 122 may be configured to provide other outputs to a user operating the engine, as well as provide outputs, such as in a log file, to users that service the engine, such as a mechanic or technician. The user interface device 560 may also indicate the emissions of the vehicle, such as a meter than moves based on the measured emissions using the hydrogen gas. The user interface device 560 may also indicate whether the supplementary fuel system is on or off, if the fuel system needs service, such as if the aqueous solution level is low or empty, or the like. The user interface device 560 may be used to display the outputs of the injection controller 122, or other outputs associated with the hydrogen fuel generator 110. The user interface device 560 may also display other indicators that are related to other systems than the supplementary fuel system. For example, the user interface devices 560 may be integrated with the user interface devices 560 of the vehicle containing the engine. In another embodiment, the injection controller 122 provides the outputs 522 to another system associated with the engine 150, such as an on-board computer of the vehicle housing the engine 150, for example.

Figure 5B:
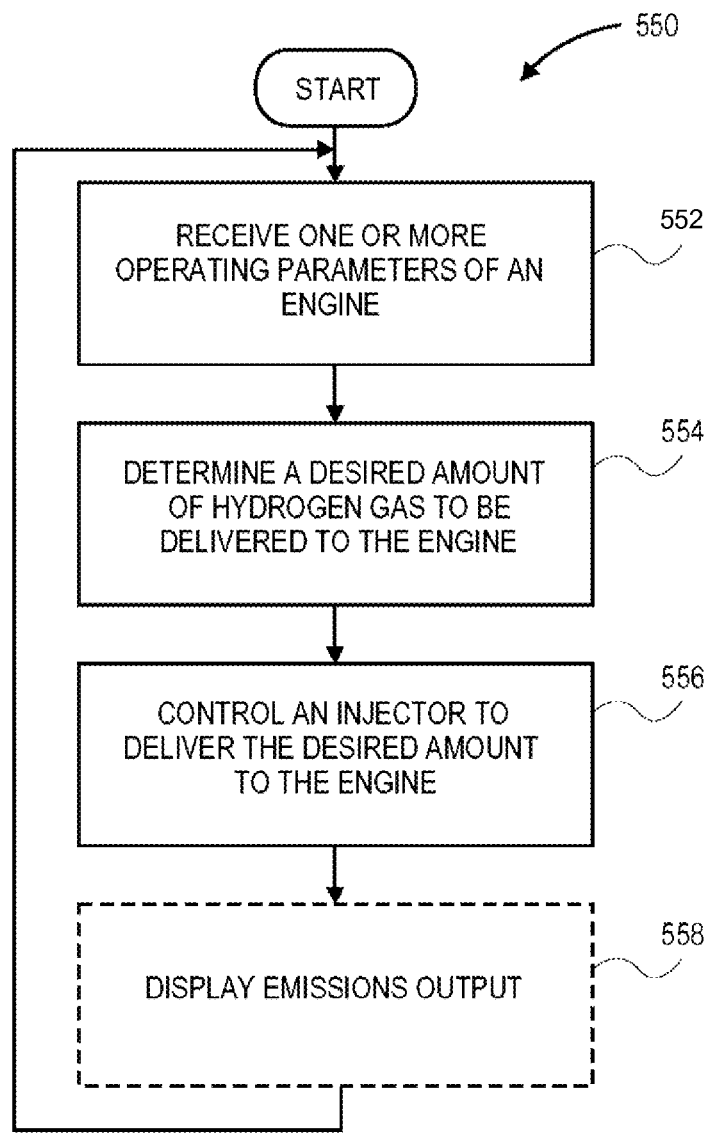
FIG. 5B is a flow diagram of one embodiment of a method of injection control for delivery of hydrogen to an engine.

FIG. 5B is a flow diagram of one embodiment of a method of injection control for delivery of hydrogen to an engine. The method 550 is performed by processing logic that may comprise hardware (circuitry, dedicated logic, etc.), software (such as is run on a general purpose computer system or a dedicated machine), firmware (embedded software), or any combination thereof. In one embodiment, the injection controller 122 of the injection control system 120 performs the method 550. In another embodiment, the computing system of an engine management system performs the method 500. Alternatively, other components of the supplementary fuel system can perform some or all of the operations of method 550.

Referring to FIG. 5B, processing logic begins with receiving one or more engine parameters, such as when the interrupt controller is programmed. After programming, and during operation, the processing logic receives one or more operating parameters of an engine (block 552). Next, the processing logic determines a desired amount of hydrogen gas to deliver to the engine (block 554), and controls an injector to deliver the desired amount to the engine (block 556). In one embodiment, the processing logic determines a desired amount of hydrogen gas to deliver using a three-dimensional map, stored in memory, which represents a pulse width of the injector for a given set of measurements, such as RPM and pressure. In another embodiment, the processing logic determines the desired amount using a look-up table. In another embodiment, the processing logic may implement an algorithm that computes the desired amount based on the engine parameters programmed by the user and the monitored operating parameters of the engine. In another embodiment, a computer in a system using the engine and hydrogen fuel generator is configured to execute instructions that cause the computer to perform the method.

In another embodiment, the processing logic also displays emission outputs to a user via a user interface device (block 558), such as a meter, digital display, or graphical user interface to indicate the increase/decrease in mileage, emissions, and/or the like. The processing logic may also display or provide various other outputs, such as fuel efficiency in terms of miles per gallon or distance to empty.

Figure 6:
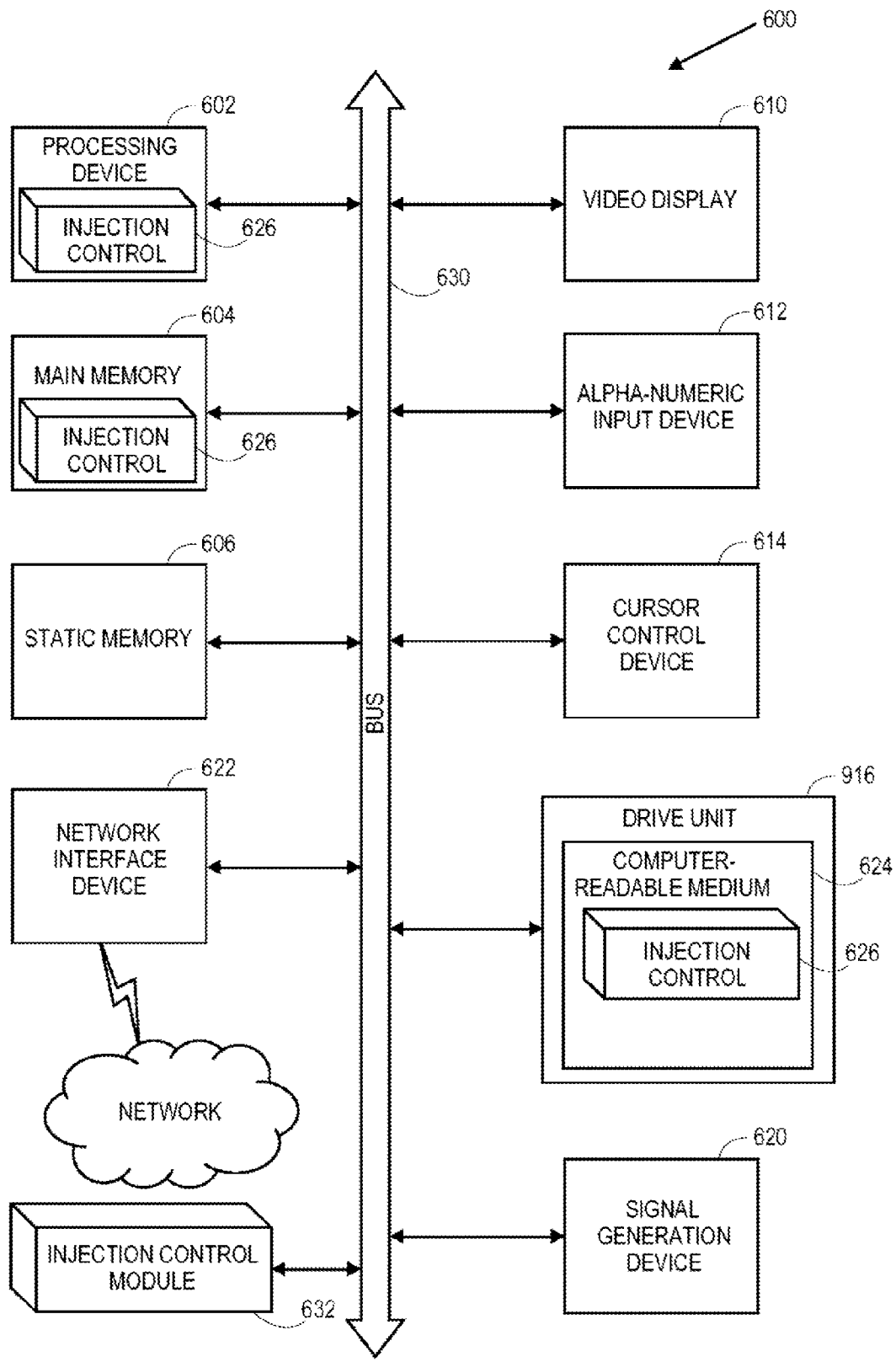
FIG. 6 illustrates a diagrammatic representation of a machine in the exemplary form of a computer system for injection control of hydrogen gas into an engine.

FIG. 6 illustrates a diagrammatic representation of a machine in the exemplary form of a computer system 600 for injection control of hydrogen gas into an engine. Within the computer system 600 is a set of instructions for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a STB, a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for injection control of hydrogen gas into the engine, such as the method 550 described above. In one embodiment, the computer system 600 represents various components that may be implemented in the injection control system 120 as described above. Alternatively, the injection control system 120 may include more or less components as illustrated in the computer system 600.

The exemplary computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 616, each of which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic (e.g., injection control 626) for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions (e.g., injection control 626) embodying any one or more of the methodologies or functions described herein. The injection control 626 may also reside, completely or at least partially, within the main memory 604 and/or within the processing device 602 during execution thereof by the computer system 600, the main memory 604 and the processing device 602 also constituting computer-readable storage media. The injection control 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The injection control module 632, components, and other features described herein (for example in relation to FIGS. 1, 5A, and 5B) can be implemented as discrete hardware components or integrated in the functionality of hardware components such as ASICS, FPGAs, DSPs or similar devices. In addition, the injection control module 632 can be implemented as firmware or functional circuitry within hardware devices. Further, the injection control module 632 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A system comprising:
an injector to receive hydrogen gas on a supply line from a hydrogen fuel generator and to deliver the hydrogen gas on an injection line to an engine;
a computerized injection controller coupled to injector, wherein the computerized injection controller is configured to:
receive a first indicator of manifold air pressure of an engine;
receive a second indicator of engine speed of the engine;
determine a desired amount of the hydrogen gas to deliver to the engine using the first indicator and the second indicator; and
control the injector to deliver the desired amount of hydrogen gas to inject into an air intake of the engine to deliver to the engine on the injection line, such that the desired amount of hydrogen gas, a desired amount of air, and a desired amount of fuel are delivered into a combustion chamber of the engine; and
the hydrogen fuel generator comprising:
a cylindrical enclosure of metal, wherein the cylindrical enclosure is to operate as a first electrode when coupled to a first terminal of a power source;
a fuel cell unit disposed within the cylindrical enclosure, wherein the fuel cell unit comprises:
a second electrode coupled to a second terminal of the power source; and
a plurality of conductive tubular cells disposed in a longitudinal direction of the cylindrical enclosure, wherein the plurality of conductive tubular cells are passive conductors and are not coupled to the first and second terminals.

2. The system of claim 1, wherein the computerized injection controller is coupled to a user interface device, and wherein the user interface device is configured to indicate emissions of the engine.

3. The system of claim 1 further comprising the air intake of a vehicle, wherein the injector is configured to deliver the desired amount of hydrogen gas on the injection line into the air intake of the vehicle.

4. The system of claim 1, wherein at least one of the plurality of conductive tubular cells comprises microscopic indentations on one or more surfaces.

5. The system of claim 1, wherein every other one of the plurality of conductive tubular cells comprises a plurality of holes on at least one surface of the respective cell.

6. The system of claim 1, wherein the computerized injection controller is further configured to determine the desired amount of the hydrogen gas to deliver to the engine using the first and second indicators and a fuel injection mapping, wherein the fuel injection mapping corresponds to combinations of air, fuel, and hydrogen according to engine parameters of the engine, the engine parameters comprising the first indicator and the second indicator, and wherein the fuel injection mapping maps values of the first indicator and values of the second indicator to desired amounts of hydrogen to inject to achieve a desired one of the combinations of air, fuel, and hydrogen.

7. The system of claim 1, wherein the cylindrical enclosure of metal is configured to hold an aqueous solution of water and electrolyte, wherein the cylindrical enclosure operates as a cathode when connected to a power source.

8. A method comprising:
receiving, at a computerized injection controller, a first indicator of manifold air pressure of an engine;

receiving, at the computerized injection controller, a second indicator of engine speed of the engine, wherein the first and second indicators are associated with emissions of the engine;

determining, by the computerized injection controller, a desired amount of hydrogen gas to deliver from a hydrogen fuel generator to the engine using the first and second indicators, wherein the hydrogen fuel generator comprises:

a cylindrical enclosure of metal, wherein the cylindrical enclosure is to operate as a first electrode when coupled to a first terminal of a power source;

a fuel cell unit disposed within the cylindrical enclosure, wherein the fuel cell unit comprises:

a second electrode coupled to a second terminal of the power source; and a plurality of conductive tubular cells disposed in a longitudinal direction of the cylindrical enclosure, wherein the plurality of conductive tubular cells are passive conductors and are not coupled to the first and second terminals; and controlling an injector, by the computerized injection controller, to deliver the desired amount of hydrogen to inject into an air intake of the engine, such that the desired amount of hydrogen, a desired amount of air, and a desired amount of fuel are delivered into a combustion chamber of the engine.

9. The method of claim 8, wherein the desired amount of hydrogen gas to deliver to the engine is determined using the first and second indicators and a fuel injection mapping, wherein the fuel injection mapping corresponds to combinations of air, fuel, and hydrogen according to engine parameters of the engine, the engine parameters comprising the first indicator and the second indicator, and wherein the fuel injection mapping maps values of the first indicator and values of the second indicator to desired amounts of hydrogen to inject to achieve a desired one of the combinations of air, fuel, and hydrogen.

10. The method of claim 8, wherein the controlling comprises controlling the desired amount of hydrogen to deliver to the air intake of a vehicle containing the engine.

11. The method of claim 8, further comprising:
calculating, by the computerized injection controller, an output indicative of the emissions of the engine; and
providing the output to a user via a user interface device.

12. The method of claim 11, wherein the providing the output on the user interface device comprises displaying the output on a display of a vehicle or machine containing the engine.

13. The method of claim 11, wherein at least one of the plurality of conductive tubular cells comprises microscopic indentations on one or more surfaces.

14. A method comprising:
modifying a fuel injection mapping of a computerized injection controller, wherein the fuel injection mapping comprises combinations of air, fuel, and hydrogen according to engine parameters of an engine, the engine parameters comprising a first indicator and a second indicator, wherein the fuel injection mapping comprises a plurality of cell locations, each of the plurality of cell locations contains a number that indicates an amount of time an injector is activated to deliver hydrogen to the engine;

receiving, at the computerized injection controller, the first indicator that comprises manifold air pressure of the engine;

receiving, at the computerized injection controller, the second indicator that comprises engine speed of the engine, wherein the first and second indicators are associated with emissions of the engine;

determining, by the computerized injection controller, a desired amount of hydrogen gas to deliver from a hydrogen fuel generator to the engine using the first and second indicators, wherein the hydrogen fuel generator comprises:

a cylindrical enclosure of metal, wherein the cylindrical enclosure is to operate as a first electrode when coupled to a first terminal of a power source;

a fuel cell unit disposed within the cylindrical enclosure, wherein the fuel cell unit comprises:

a second electrode coupled to a second terminal of the power source; and a plurality of conductive tubular cells disposed in a longitudinal direction of the cylindrical enclosure, wherein the plurality of conductive tubular cells are passive conductors and are not coupled to the first and second terminals; and controlling an injector, by the computerized injection controller, to deliver the desired amount of hydrogen to inject into an air intake of the engine, such that the desired amount of hydrogen, a desired amount of air, and a desired amount of fuel are delivered into a combustion chamber of the engine.

15. The method of claim 14, wherein the determining comprises determining which of the plurality of cell locations to use using the first and second indicators as indexes to lookup the amount of time the injector is activated.

16. The method of claim 14, further comprising:
calculating, by the computerized injection controller, an output indicative of the emissions of the engine; and
providing the output to a user via a user interface device.

17. The method of claim 16, wherein the providing the output on the user interface device comprises displaying the output on a display of a vehicle or machine containing the engine.

18. The method of claim 17, wherein the providing the output on the user interface device comprises displaying the output on a display of a vehicle or machine containing the engine.

19. The method of claim 14, wherein the controlling comprises controlling the desired amount of hydrogen to deliver to the air intake of a vehicle containing the engine.

20. The method of claim 14, wherein at least one of the plurality of conductive tubular cells comprises microscopic indentations on one or more surfaces.

\* \* \* \* \*